(12) United States Patent
Nagata et al.

(10) Patent No.: US 9,410,828 B2
(45) Date of Patent: Aug. 9, 2016

(54) SERVOMOTOR AND ENCODER

(71) Applicant: MITSUBISHI ELECTRIC CORPORATION, Chiyoda-ku, Tokyo (JP)

(72) Inventors: Hiroshi Nagata, Chiyoda-ku (JP); Toshikazu Satone, Chiyoda-ku (JP); Masanori Nimura, Chiyoda-ku (JP); Hajime Nakajima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 320 days.

(21) Appl. No.: 14/347,773

(22) PCT Filed: Apr. 24, 2013

(86) PCT No.: PCT/JP2013/062082
§ 371 (c)(1),
(2) Date: Mar. 27, 2014

(87) PCT Pub. No.: WO2014/174614
PCT Pub. Date: Oct. 30, 2014

(65) Prior Publication Data
US 2016/0131508 A1    May 12, 2016

(51) Int. Cl.
*G01D 18/00*    (2006.01)
*G01D 5/347*    (2006.01)
(Continued)

(52) U.S. Cl.
CPC .............. *G01D 18/00* (2013.01); *G01D 5/3473* (2013.01); *G06F 3/0312* (2013.01); *G01D 5/2451* (2013.01); *G01D 5/2454* (2013.01); *G01D 5/2458* (2013.01)

(58) Field of Classification Search
CPC .. G06F 3/0312; G01D 5/3473; G01D 5/2451; G01D 5/2452; G01D 5/2454; G01D 5/2458
See application file for complete search history.

(56) References Cited

U.S. PATENT DOCUMENTS 6,278,389 B1    8/2001    Lochmann et al.
6,906,491 B2    6/2005    Matsuo et al.
(Continued)

FOREIGN PATENT DOCUMENTS

DE    19712869 A1    10/1998
DE    19757196 A1    6/1999
(Continued)

OTHER PUBLICATIONS

Communication dated Dec. 9, 2015 from the German Patent and Trademark Office in counterpart application No. 112013006990.3.
(Continued)

*Primary Examiner* — Francis M Legasse, Jr.
(74) *Attorney, Agent, or Firm* — Sughrue Mion, PLLC

(57) ABSTRACT

An encoder includes a first multiple rotation counter that generates first multiple rotation data using a rotation signal indicating one rotation of a rotational shaft of a motor, a second multiple rotation counter that generates second multiple rotation data using the rotation signal, a first cumulative-number calculation unit that calculates first accumulated multiple rotation data using an angle signal indicating a rotational angle of the rotational shaft, a second cumulative-number calculation unit that calculates second accumulated multiple rotation data using the angle signal, and a first comparative diagnosis unit that diagnoses whether the encoder has a fault by performing a comparison to determine whether the first multiple rotation data, the second multiple rotation data, the first accumulated multiple rotation data, and the second accumulated multiple rotation data are a same value.

12 Claims, 4 Drawing Sheets

(51) Int. Cl.
*G06F 3/03* (2006.01)
*G01D 5/245* (2006.01)

(56) References Cited

U.S. PATENT DOCUMENTS

| | | |
|---|---|---|
| 8,400,096 B2 | 3/2013 | Miyashita et al. |
| 2003/0145663 A1 | 8/2003 | Heisenberg et al. |
| 2003/0223374 A1 | 12/2003 | Hayashi |
| 2004/0257027 A1 | 12/2004 | Matsuo et al. |
| 2008/0157705 A1 | 7/2008 | Sasaki et al. |
| 2010/0225308 A1* | 9/2010 | Kurumado ............ G01D 5/2451 324/207.25 |
| 2011/0156505 A1 | 6/2011 | Miyashita et al. |
| 2011/0309824 A1* | 12/2011 | Takahashi ............ F16C 41/007 324/207.13 |

FOREIGN PATENT DOCUMENTS

| | | |
|---|---|---|
| DE | 10041095 A1 | 6/2001 |
| DE | 112008003911 T5 | 6/2011 |
| JP | 2003-315099 A | 11/2003 |
| JP | 2005-12997 A | 1/2005 |
| JP | 2007-114032 A | 5/2007 |
| JP | 2008-180698 A | 8/2008 |
| JP | 2008-301555 A | 12/2008 |
| JP | 2010-19575 A | 1/2010 |
| JP | 5108165 B1 | 12/2012 |

OTHER PUBLICATIONS

International Search Report of PCT/JP2013/062082, dated Jun. 4, 2013.

* cited by examiner

FIG.2

| COMPARATIVE DIAGNOSIS 1 (MULTIPLE ROTATION DATA) | COMPARATIVE DIAGNOSIS 2 (ACCUMULATED MULTIPLE ROTATION DATA) | ESTIMATED FAULTY PORTION |
|---|---|---|
| (Mx)=(My) | (Mx)=(My)=(Ax)=(Ay) | NO ABNORMALITY |
| | (Mx)≠(Ax), (Mx)=(Ax)=(Ay) | (Ax) |
| | (My)≠(Ay), (Mx)=(My)=(Ax) | (Ay) |
| (Mx)≠(My) | (Mx)≠(Ax), (My)=(Ax)=(Ay) | (Mx) |
| | (My)≠(Ay), (Mx)=(Ax)=(Ay) | (My) |

SERVOMOTOR AND ENCODER

CROSS REFERENCE TO RELATED APPLICATIONS

This application is a National Stage of International Application No. PCT/JP2013/062082 filed Apr. 24, 2013, the contents of all of which are incorporated herein by reference in their entirety.

FIELD

The present invention relates to a servomotor and an encoder that detect a rotational angle and the number of rotations of a rotational shaft while detecting a fault.

BACKGROUND

In the field of a servo system that controls a motor while detecting the rotational angle and the number of rotations of a rotational shaft, it is important to ensure safety. Accordingly, it is important to also ensure the reliability of an encoder that is a constituent element of the servo system by improving a fault detection rate.

For example, a servo system described in each of Patent Literatures 1 to 4 detects an abnormality of an encoder included in the servo system by comparing a plurality of signals relating to a rotational position (such as the number of rotations of a rotational shaft).

CITATION LIST

Patent Literatures

Patent Literature 1: Japanese Patent Application Laid-open No. 2003-315099
Patent Literature 2: Japanese Patent Application Laid-open No. 2007-114032
Patent Literature 3: Japanese Patent Application Laid-open No. 2010-19575
Patent Literature 4: Japanese Patent Application Laid-open No. 2005-12997

SUMMARY

Technical Problem

However, the conventional techniques described in Patent Literatures 1 to 4 have a problem of low reliability in fault detections.

The present invention has been achieved in view of the above problem, and an object of the present invention is to provide a servomotor and an encoder capable of performing a highly reliable fault detection.

Solution to Problem

In order to solve the above problem and in order to attain the above object, a servomotor of the present invention includes: a motor including a rotational shaft; and an encoder that generates multiple rotation data obtained by counting rotations of the rotational shaft using rotation signals that indicate one rotation of the rotational shaft, one-rotation data calculated using an angle signal that indicates a rotational angle of the rotational shaft and indicating a rotational angle within one rotation, and accumulated multiple rotation data obtained by accumulating the rotational angles using the angle signal and by counting the rotations of the rotational shaft whenever the rotational shaft makes one rotation, and that transmits either the multiple rotation data or the accumulated multiple rotation data and the one-rotation data to a motor control device. The encoder includes: a rotation detection unit that detects a rotational position of the rotational shaft; a first multiple rotation counter that generates first multiple rotation data using the rotation signals generated based on the rotational position; a second multiple rotation counter that generates second multiple rotation data using the rotation signals generated based on the rotational position; a first cumulative-number calculation unit that calculates first accumulated multiple rotation data using the angle signal generated based on the rotational position; a second cumulative-number calculation unit that calculates second accumulated multiple rotation data using the angle signal generated based on the rotational position; and a first comparative diagnosis unit that performs a comparison to determine whether at least four values including at least two values relating to number of rotations and generated using rotation signals and at least two values relating to number of rotations and calculated using the angle signal are a same value by performing a comparison to determine whether the first multiple rotation data, the second multiple rotation data, the first accumulated multiple rotation data, and the second accumulated multiple rotation data are a same value, and that diagnoses whether the encoder has a fault based on a comparison result.

Advantageous Effects of Invention

According to the present invention, a highly reliably fault detection can be performed.

BRIEF DESCRIPTION OF DRAWINGS

FIG. 2 is an explanatory diagram of an example of a fault determination.

DESCRIPTION OF EMBODIMENTS

Exemplary embodiments of a servomotor and an encoder according to the present invention will be explained below in detail with reference to the accompanying drawings. The present invention is not limited to the embodiments.

First Embodiment

Figure 1:
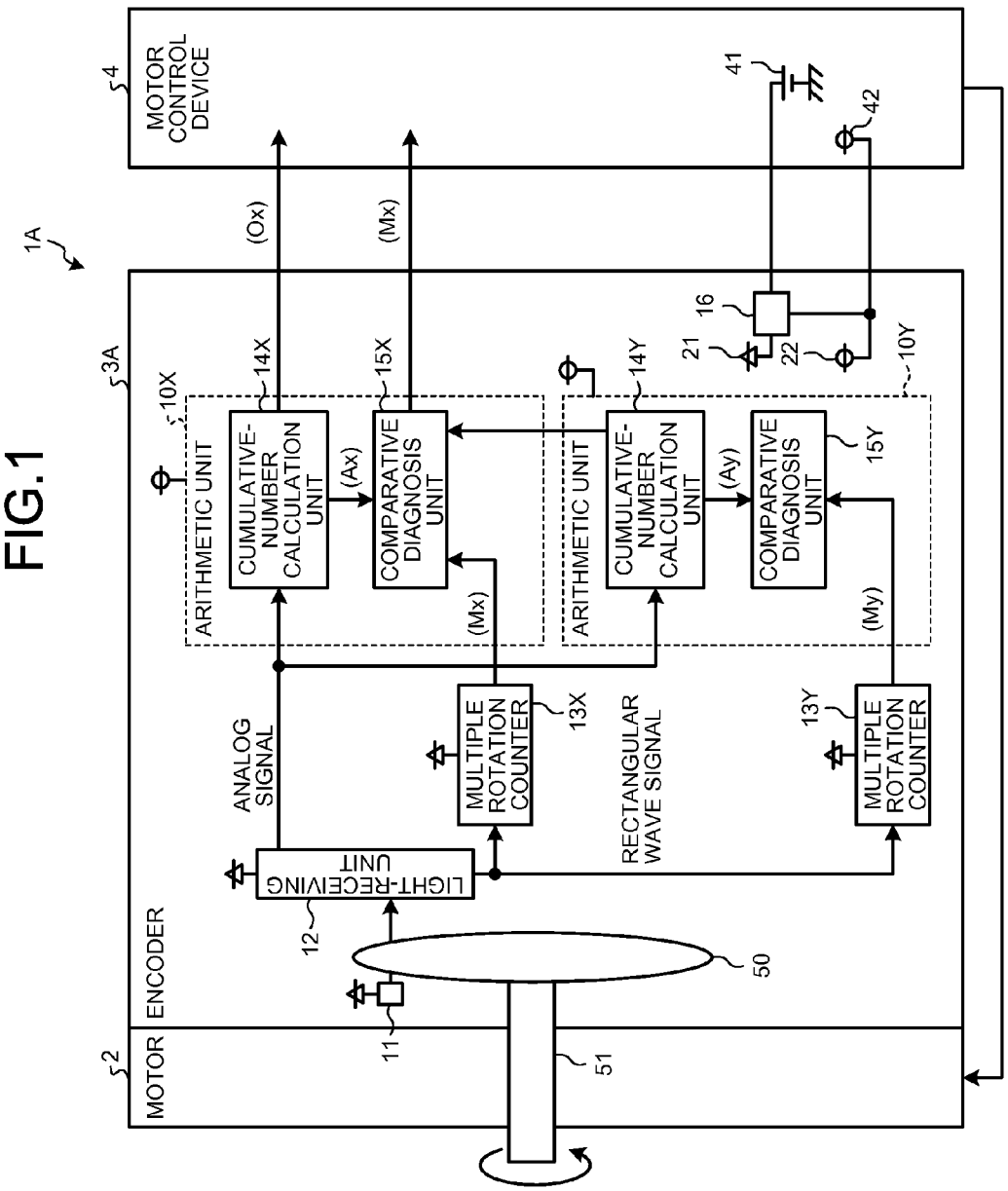
FIG. 1 depicts a configuration of a servo system including an encoder according to a first embodiment.

FIG. 1 depicts a configuration of a servo system including an encoder according to a first embodiment. A servo system 1A includes a servomotor (a motor 2 and an encoder 3A) and a motor control device (servo amplifier) 4.

The servo system 1A according to the present embodiment diagnoses a faulty portion (identifies a fault position) of the encoder 3A by comparing plural pieces of data including plural pieces of multiple rotation data and plural pieces of accumulated multiple rotation data. The multiple rotation data according to the present embodiment is data (a count value) obtained by counting rotations of a rotational shaft, and the accumulated multiple rotation data is data (a count value) obtained by accumulating rotational angles of the rotational shaft up to one rotation and counting the rotations of the rotational shaft whenever the rotational shaft makes one rotation.

The motor 2 rotates a pulse disk 50 within the encoder 3A by rotating a rotational shaft 51. One end of the rotational shaft 51 is connected to the pulse disk 50 and the other end thereof is connected to a robot arm or the like. The motor 2 is current-controlled by the motor control device 4.

The encoder 3A includes the pulse disk 50, a light-emitting unit 11, a light-receiving unit 12, multiple rotation counters 13X and 13Y, arithmetic units 10X and 10Y, a power-supply switching circuit 16, a battery power supply 21, and a control power supply 22.

The light-emitting unit 11 irradiates light from one principal surface of the pulse disk 50. The light-receiving unit 12 is arranged on the other principal surface side of the pulse disk 50, and serves as a rotation detection unit that optically detects a rotational position of the rotational shaft 51. The light-receiving unit 12 detects a rotational state (a rotational position) of the rotational shaft 51 by receiving light passing through the pulse disk 50 out of the light irradiated from the light-emitting unit 11 as an optical signal. With this configuration, an optical system including the light-emitting unit 11 and the light-receiving unit 12 detects the rotational position of the rotational shaft 51.

The light-receiving unit 12 transmits the rotational state of the rotational shaft 51 to the multiple rotation counters 13X and 13Y and the arithmetic units 10X and 10Y as a waveform (a sine wave and a cosine wave). The waveform (received light waveform indicating the rotational position) generated by the light-receiving unit 12 is transmitted to a comparator (not shown). The comparator generates a rectangular wave signal from the sine wave and also generates a rectangular wave signal from the cosine wave. The comparator transmits the generated rectangular wave signals to each of the multiple rotation counters 13X and 13Y. Furthermore, the light-receiving unit 12 transmits the waveform of the detected light to a cumulative-number calculation unit 14X of the arithmetic unit 10X and a cumulative-number calculation unit 14Y of the arithmetic unit 10Y as an analog signal.

Each of the multiple rotation counters 13X and 13Y counts rotations of the rotational shaft 51 based on the rectangular wave signals. A combination of the rectangular wave signal generated from the sine wave and that generated from the cosine wave is a signal (rotation signal) indicating one rotation of the rotational shaft 51. Therefore, each of the multiple rotation counters 13X and 13Y counts the rotations of the rotational shaft 51 using the signal indicating one rotation of the rotational shaft 51.

The multiple rotation counter 13X transmits the counted number of rotations to a comparative diagnosis unit 15X of the arithmetic unit 10X as multiple rotation data (Mx). The multiple rotation counter 13Y transmits the counted number of rotations to a comparative diagnosis unit 15Y of the arithmetic unit 10Y as multiple rotation data (MY).

The arithmetic unit 10X includes the cumulative-number calculation unit 14X and the comparative diagnosis unit 15X. The cumulative-number calculation unit 14X receives the analog signal transmitted from the light-receiving unit 12. The analog signal is a signal (angle signal) indicating a rotational angle (0 degree to 360 degrees) of the rotational shaft 51. The cumulative-number calculation unit 14X calculates the rotational angle of the rotational shaft 51 based on the analog signal.

The cumulative-number calculation unit 14X accumulates the rotational angles, and counts up the rotations of the rotational shaft 51 by incrementing the count value by one whenever the rotational shaft 51 makes one rotation. The cumulative-number calculation unit 14X transmits the counted number of rotations (a total number) to the comparative diagnosis unit 15X as accumulated multiple rotation data (Ax).

The comparative diagnosis unit 15X determines whether the multiple rotation data (Mx) is equal to the accumulated multiple rotation data (Ax) by comparing the multiple rotation data (Mx) with the accumulated multiple rotation data (Ax). The comparative diagnosis unit 15X holds a determination result (hereinafter, "determination result MAx") as to whether the multiple rotation data (Mx) is equal to the accumulated multiple rotation data (Ax).

Furthermore, the comparative diagnosis unit 15X receives a determination result (a determination result MAy described later), the multiple rotation data (My), and accumulated multiple rotation data (Ay) (described later) transmitted from the arithmetic unit 10Y.

The comparative diagnosis unit 15X conducts a fault diagnosis of the encoder 3A based on the multiple rotation data (Mx), the multiple rotation data (My), the determination result MAx, the accumulated multiple rotation data (Ax), the accumulated multiple rotation data (Ay), and the determination result MAy.

When the comparative diagnosis unit 15X determines that the encoder 3A has no faulty portion, the cumulative-number calculation unit 14X transmits data indicating the rotational angle of the rotational shaft 51 to the motor control device 4 as one-rotation data (Ox). Furthermore, when the comparative diagnosis unit 15X determines that the encoder 3A has no faulty portion, the comparative diagnosis unit 15X transmits the multiple rotation data (Mx) to the motor control device 4. Alternatively, the comparative diagnosis unit 15X can transmit any one of the multiple rotation data (My), the accumulated multiple rotation data (Ax), and the accumulated multiple rotation data (Ay) to the motor control device 4 in place of the multiple rotation data (Mx).

The arithmetic unit 10Y includes the cumulative-number calculation unit 14Y and the comparative diagnosis unit 15Y. The cumulative-number calculation unit 14Y receives the analog signal transmitted from the light-receiving unit 12. The cumulative-number calculation unit 14Y calculates the rotational angle (0 degree to 360 degrees) of the rotational shaft 51 based on the analog signal.

The cumulative-number calculation unit 14Y accumulates the rotational angles, and counts up the rotations of the rotational shaft 51 by incrementing the count value by one whenever the rotational shaft 51 makes one rotation. In other words, the cumulative-number calculation unit 14Y counts the rotations of the rotational shaft 51 using the one-rotation data (Ox) indicating the rotational angle of the rotational shaft 51. The cumulative-number calculation unit 14Y transmits the counted number of rotations (a total number) to the comparative diagnosis unit 15Y as the accumulated multiple rotation data (Ay).

The comparative diagnosis unit 15Y determines whether the multiple rotation data (My) is equal to the accumulated multiple rotation data (Ay) by comparing the multiple rotation data (My) with the accumulated multiple rotation data (Ay). The comparative diagnosis unit 15Y transmits the determination result MAy as to whether the multiple rotation data (My) is equal to the accumulated multiple rotation data (Ay), the multiple rotation data (My), and the accumulated multiple rotation data (Ay) to the comparative diagnosis unit 15X of the arithmetic unit 10X.

The power-supply switching circuit 16 is connected to the battery power supply 21, the control power supply 22, a battery 41, and a power supply unit 42. The battery 41 and the power supply unit 42 are arranged in the motor control device 4.

The power-supply switching circuit 16 performs switching between circuits so that power is supplied from the power supply unit 42 to the battery power supply 21 and the control power supply 22, while the motor control device 4 is powered on. On the other hand, the power-supply switching circuit 16 performs switching between circuits so that the power stored in the battery 41 is supplied to the battery power supply 21 while the motor control device 4 is powered off. In other words, the control power supply 22 is turned on while the motor control device 4 is powered on, and the battery power supply 21 is turned on while the motor control device 4 is powered on or powered off.

With this configuration, the power supply unit 42 supplies the power to the battery power supply 21 and the control power supply 22, while the motor control device 4 is powered on. Furthermore, the battery 41 supplies the power to the battery power supply 21 while the motor control device 4 is powered off.

In the encoder 3A, the control power supply 22 is connected to the arithmetic units 10X and 10Y. Furthermore, in the encoder 3A, the battery power supply 21 is connected to the light-emitting unit 11, the light-receiving unit 12, and the multiple rotation counters 13X and 13Y.

With this configuration, the multiple rotation counters 13X and 13Y generate the multiple rotation data (Mx) and the multiple rotation data (My), respectively, and the cumulative-number calculation units 14X and 14Y generate the accumulated multiple rotation data (Ax) and the accumulated multiple rotation data (Ay), respectively while the motor control device 4 is powered on.

On the other hand, the multiple rotation counters 13X and 13Y generate the multiple rotation data (Mx) and the multiple rotation data (My), respectively, and the cumulative-number calculation units 14X and 14Y do not generate the accumulated multiple rotation data (Ax) and the accumulated multiple rotation data (Ay), respectively while the motor control device 4 is powered off. While a case of using the battery power supply 21 has been described, the control power supply 22 can be used in place of the battery power supply 21.

The motor control device 4 is connected to the encoder 3A and the motor 2. The motor control device 4 controls the motor 2 based on the one-rotation data (Ox) and the multiple rotation data (Mx) transmitted from the encoder 3A.

A fault diagnosis process performed in the encoder 3A is explained next. Because the fault diagnosis process performed by the comparative diagnosis unit 15X is the same as that performed by the comparative diagnosis unit 15Y, the fault diagnosis process performed by the comparative diagnosis unit 15X is explained here.

(Fault Diagnosis Example 1)

FIG. 2 is an explanatory diagram of an example of a fault determination. The comparative diagnosis unit 15X conducts the fault diagnosis of the encoder 3A based on the multiple rotation data (Mx), the multiple rotation data (My), the determination result MAx, the accumulated multiple rotation data (Ax), the accumulated multiple rotation data (Ay), and the determination result MAy.

The comparative diagnosis unit 15X determines whether the multiple rotation data (Mx) is equal to the multiple rotation data (My) (a comparative diagnosis 1). Furthermore, the comparative diagnosis unit 15X confirms whether the determination result MAx indicates that the multiple rotation data (Mx) is equal to the accumulated multiple rotation data (Ax) (Mx=Ax) and whether the determination result MAy indicates that the multiple rotation data (My) is equal to the accumulated multiple rotation data (Ay) (My=Ay) (a comparative diagnosis 2). The comparative diagnosis 1 mentioned here is a comparative diagnosis of the multiple rotation data and the comparative diagnosis 2 is a comparative diagnosis of the accumulated multiple rotation data.

In a case of (Mx=My), the comparative diagnosis unit 15X determines that (Mx=My=Ax=Ay) and that the encoder 3A has no abnormality when the determination results MAx and MAy indicate that the multiple rotation data (Mx and My) are equal to the accumulated multiple rotation data (Ax and Ay), respectively.

In the case of (Mx=My), the comparative diagnosis unit 15X determines that (Mx=My=Ay) and that the accumulated multiple rotation data (Ax) is abnormal when the determination result MAx indicates that the multiple rotation data (Mx) is not equal to the accumulated multiple rotation data (Ax) (Mx≠Ax) and the determination result MAy indicates that the multiple rotation data (My) is equal to the accumulated multiple rotation data (Ay) (My=Ay). In other words, it is estimated that a portion relating to the accumulated multiple rotation data (Ax) is a faulty portion.

In the case of (Mx=My), the comparative diagnosis unit 15X determines that (Mx=My=Ax) and that the accumulated multiple rotation data (Ay) is abnormal when the determination result MAy indicates that the multiple rotation data (My) is not equal to the accumulated multiple rotation data (Ay) (My≠Ay) and the determination result MAx indicates that the multiple rotation data (Mx) is equal to the accumulated multiple rotation data (Ax) (Mx=Ax). In other words, it is estimated that a portion relating to the accumulated multiple rotation data (Ay) is the faulty portion.

In a case of (Mx≠My), the comparative diagnosis unit 15X determines that (Ax=My=Ay) and that the multiple rotation data (Mx) is abnormal when the determination result MAx indicates that the multiple rotation data (Mx) is not equal to the accumulated multiple rotation data (Ax) (Mx≠Ax) and the determination result MAy indicates that the multiple rotation data (My) is equal to the accumulated multiple rotation data (Ay) (My=Ay). In other words, it is estimated that a portion relating to the multiple rotation data (Mx) is the faulty portion.

In the case of (Mx≠My), the comparative diagnosis unit 15X determines that (Mx=Ax=Ay) and that the multiple rotation data (My) is abnormal when the determination result MAy indicates that the multiple rotation data (My) is not equal to the accumulated multiple rotation data (Ay) (My≠Ay) and the determination result MAx indicates that the multiple rotation data (Mx) is equal to the accumulated multiple rotation data (Ax) (Mx=Ax). In other words, it is estimated that a portion relating to the multiple rotation data (My) is the faulty portion.

The comparative diagnosis unit 15X determines that a fault occurs to a portion from the light-receiving unit 12 to the cumulative-number calculation unit 14X when the portion relating to the accumulated multiple rotation data (Ax) is estimated as the faulty portion. For example, the comparative diagnosis unit 15X determines that a fault occurs to the cumulative-number calculation unit 14X itself as the portion relating to the accumulated multiple rotation data (Ax).

The comparative diagnosis unit 15X determines that a fault occurs to a portion from the light-receiving unit 12 to the cumulative-number calculation unit 14Y when the portion relating to the accumulated multiple rotation data (Ay) is estimated as the faulty portion. For example, the comparative diagnosis unit 15X determines that a fault occurs to the cumulative-number calculation unit 14Y itself as the portion relating to the accumulated multiple rotation data (Ay).

The comparative diagnosis unit 15X determines that a fault occurs to a portion from the light-receiving unit 12 to the multiple rotation counter 13X when the portion relating to the multiple rotation data (Mx) is estimated as the faulty portion. For example, the comparative diagnosis unit 15X determines that a fault occurs to the multiple rotation counter 13X itself as the portion relating to the multiple rotation data (Mx).

The comparative diagnosis unit 15X determines that a fault occurs to a portion from the light-receiving unit 12 to the multiple rotation counter 13Y when the portion relating to the multiple rotation data (My) is estimated as the faulty portion. For example, the comparative diagnosis unit 15X determines that a fault occurs to the multiple rotation counter 13Y itself as the portion relating to the multiple rotation data (My).

When the comparative diagnosis unit 15X determines that the encoder 3A has no abnormality, the arithmetic unit 10X continues to transmit the rotation data (Ox) and the multiple rotation data (Mx) to the motor control device 4. The servo system 1A thereby continues to operate.

On the other hand, when the comparative diagnosis unit 15X determines that the encoder 3A has an abnormality, the arithmetic unit 10X stops to transmit the rotation data (Ox) and the multiple rotation data (Mx) to the motor control device 4. The servo system 1A thereby stops to operate. In other words, the encoder 3A stops to operate when it is determined that the encoder 3A has an abnormality.

(Fault Diagnosis Example 2)

A fault diagnosis procedure according to which the comparative diagnosis unit 15X conducts the fault diagnosis is not limited to the fault diagnosis procedure described above, and the comparative diagnosis unit 15X can conduct the fault diagnosis according to an arbitrary procedure. For example, the determinations by the comparative diagnosis unit 15Y can be omitted and the comparative diagnosis unit 15X can conduct the fault diagnosis using the accumulated multiple rotation data (Ax), the accumulated multiple rotation data (Ay), the multiple rotation data (Mx), and the multiple rotation data (My).

(Fault Diagnosis Example 3-1)

The comparative diagnosis unit 15X can conduct the fault diagnosis using three pieces of data of the accumulated multiple rotation data (Ax), the accumulated multiple rotation data (Ay), the multiple rotation data (Mx), and the multiple rotation data (My). For example, the comparative diagnosis unit 15X can conduct the fault diagnosis using the three pieces of data including the accumulated multiple rotation data (Ax), the accumulated multiple rotation data (Ay), and one of the multiple rotation data (Mx) and the multiple rotation data (My).

(Fault Diagnosis Example 3-2)

The comparative diagnosis unit 15X can conduct the fault diagnosis using the accumulated multiple rotation data (Ax) and the determination result (MAy) of the comparative diagnosis unit 15Y. Alternatively, the comparative diagnosis unit 15X can conduct the fault diagnosis using the multiple rotation data (Mx) and the determination result (MAy) of the comparative diagnosis unit 15Y.

(Fault Diagnosis Example 4)

The comparative diagnosis unit 15Y can conduct a fault diagnosis by a similar process to the process performed by the comparative diagnosis unit 15X. In this case, the comparative diagnosis unit 15X transmits the determination result MAx as to whether the multiple rotation data (Mx) is equal to the accumulated multiple rotation data (Ax), the multiple rotation data (Mx), and the accumulated multiple rotation data (Ax) to the comparative diagnosis unit 15Y of the arithmetic unit 10Y.

The comparative diagnosis unit 15Y then conducts the fault diagnosis by the similar process to the process performed by the comparative diagnosis unit 15X. The comparative diagnosis unit 15Y then transmits a comparative diagnosis result to the comparative diagnosis unit 15X. The comparative diagnosis unit 15X thereby compares a comparative diagnosis result of the comparative diagnosis unit 15X with that of the comparative diagnosis unit 15Y.

In this case, when the comparative diagnosis result of the comparative diagnosis unit 15X differs from that of the comparative diagnosis unit 15Y, the comparative diagnosis unit 15X determines that either one of the comparative diagnosis units 15X and 15Y has a fault.

For example, when the comparative diagnosis result of the comparative diagnosis unit 15X indicates that the encoder 3A has an abnormality, the comparative diagnosis unit 15X determines that the comparative diagnosis unit 15X has a fault. When the comparative diagnosis result of the comparative diagnosis unit 15Y indicates that the encoder 3A has an abnormality, the comparative diagnosis unit 15X determines that the comparative diagnosis unit 15Y has a fault.

When both of the comparative diagnosis units 15X and 15Y determine that the encoder 3A has no abnormality, the arithmetic unit 10X continues to transmit the rotation data (Ox) and the multiple rotation data (Mx) to the motor control device 4. The servo system 1A thereby continues to operate.

On the other hand, when at least one of the comparative diagnosis units 15X and 15Y determines that the encoder 3A has an abnormality, the arithmetic unit 10X stops to transmit the rotation data (Ox) and the multiple rotation data (Mx) to the motor control device 4. The servo system 1A thereby stops to operate.

(Fault Diagnosis Example 5)

A comparison process by the comparative diagnosis unit 15Y for comparing the multiple rotation data (My) with the accumulated multiple rotation data (Ay) can be performed by both of the comparative diagnosis units 15X and 15Y. In this case, the comparative diagnosis unit 15X further compares the determination result MAy of the comparative diagnosis unit 15X with the determination result MAy of the comparative diagnosis unit 15Y. In this case, when the determination result MAy of the comparative diagnosis unit 15X differs from that of the comparative diagnosis unit 15Y, the comparative diagnosis unit 15X determines that either one of the comparative diagnosis units 15X and 15Y has a fault.

In this case, the comparative diagnosis unit 15X stops to transmit the rotation data (Ox) and the multiple rotation data (Mx) to the motor control device 4. The servo system 1A thereby stops to operate.

(Fault Diagnosis Example 6)

The encoder 3A can conduct the fault diagnosis of the encoder 3A by combining at least two of the (fault diagnosis example 1) to the (fault diagnosis example 5) described above. In this case, when it is determined that the encoder 3A has an abnormality in at least one of the (fault diagnosis example 1) to the (fault diagnosis example 5), the encoder 3A stops to operate.

(Omitting to Identify Faulty Portion)

When at least one of the determination results MAx and MAy indicates that the multiple rotation data (Mx or My) is not equal to the accumulated multiple rotation data (Ax or Ay), the comparative diagnosis unit 15X can omit a process for identifying the faulty portion and cause the encoder 3A to stop to operate. In this case, a determination process for determining whether the multiple rotation data (Mx) is equal to the multiple rotation data (My) and the like are omitted. Furthermore, in the case of (Mx≠My), the comparative diagnosis unit 15X can omit the process for identifying the faulty portion and cause the encoder 3A to stop to operate.

(Continuing to Operate Using Normal Portions)

The arithmetic unit 10X can cause the servo system 1A to continue to operate using the data detected by portions determined to have no abnormality even if at least one of the comparative diagnosis units 15X and 15Y determines that the encoder 3A has an abnormality.

For example, when the faulty portion estimated by the comparative diagnosis unit 15X is the same as that estimated by the comparative diagnosis unit 15Y, the arithmetic unit 10X causes the servo system 1A to continue to operate using the data generated by the portions other than the estimated faulty portion. In this case, data generation by the estimated faulty portion can be stopped.

For example, when the comparative diagnosis units 15X and 15Y estimate that the portion relating to the accumulated multiple rotation data (Ax) is the faulty portion, the arithmetic unit 10X transmits the one-rotation data (Ox) generated by the cumulative-number calculation unit 14Y to the motor control device 4. At this time, the comparative diagnosis unit 15X transmits any one of the multiple rotation data (Mx) generated by the multiple rotation counter 13X, the multiple rotation data (My) generated by the multiple rotation counter 13y, and the accumulated multiple rotation data (Ay) generated by the cumulative-number calculation unit 14Y to the motor control device 4.

In this way, the encoder 3A according to the present embodiment performs a comparison to determine whether the multiple rotation data (Mx), the multiple rotation data (My), the accumulated multiple rotation data (Ax), and the accumulated multiple rotation data (Ay) are the same value. Accordingly, the encoder 3A performs a comparison to determine whether at least four values including at least two values relating to the number of rotations and calculated using the signal indicating one rotation of the rotational shaft 51 and at least two values relating to the number of rotations and generated using the signal indicating the rotational angle of the rotational shaft 51 are the same value. The encoder 3A diagnoses whether the encoder 3A has a fault based on a comparison result.

In the present embodiment, a case where the servo system 1A includes two arithmetic units and two multiple rotation counters has been described. However, it suffices that the number of at least either the arithmetic units or the multiple rotation counters is three or more.

In this way, according to the first embodiment, it is possible to perform a highly reliable fault detection because the fault diagnosis of the encoder 3A is conducted using the four pieces of data, that is, the accumulated multiple rotation data (Ax), the accumulated multiple rotation data (Ay), the multiple rotation data (Mx), and the multiple rotation data (My).

It is also possible to diagnose (to estimate) the faulty portion because the fault diagnosis of the encoder 3A is conducted using the four pieces of data, that is, the accumulated multiple rotation data (Ax), the accumulated multiple rotation data (Ay), the multiple rotation data (Mx), and the multiple rotation data (My).

Furthermore, it is possible to perform a highly reliable fault detection because plural pieces of multiple rotation data can be ensured even at a time when the motor control device 4 is powered off (at a time of battery backup). It is also possible to ensure the reliability even if one comparative diagnosis unit itself is abnormal because the encoder 3A includes plural pieces of comparative diagnosis units (arithmetic units).

Further, the encoder 3A can be made simple in configuration because the multiple rotation counters 13X and 13Y receive the rectangular wave signals from the common light-receiving unit 12. In other words, the use of the common detection system (optical system) can make a system configuration simple.

Second Embodiment

A second embodiment of the present invention is explained with reference to FIG. 3. In the second embodiment, a pulse signal detected using a magnetic sensor is transmitted to the multiple rotation counters. The multiple rotation counters generate multiple rotation data based on the pulse signal.

Figure 3:
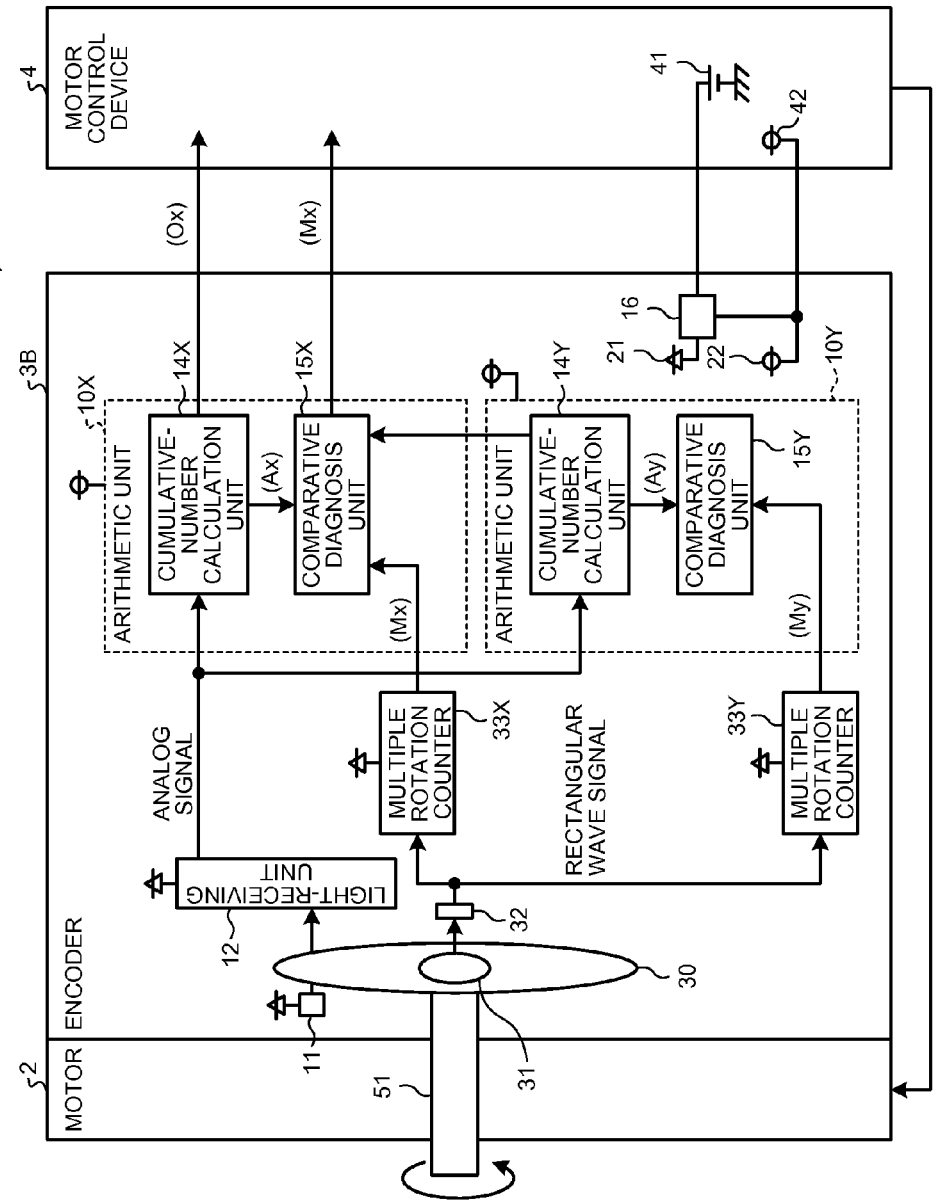
FIG. 3 depicts a configuration of a servo system including an encoder according to a second embodiment.

FIG. 3 depicts a configuration of a servo system including an encoder according to the second embodiment. Among the constituent elements shown in FIG. 3, those achieving like functions as the servo system 1A according to the first embodiment shown in FIG. 1 are denoted by like reference signs and redundant explanations thereof will be omitted.

A servo system 1B includes a servomotor (the motor 2 and an encoder 3B) and the motor control device 4. The encoder 3B includes multiple rotation counters 33X and 33Y in place of the multiple rotation counters 13X and 13Y, as compared with the encoder 3A. The encoder 3B also includes a pulse disk 30 in place of the pulse disk 50 and a magnetic sensor 32, as compared with the encoder 3A.

In the encoder 3B, the multiple rotation counter 33X is connected to the comparative diagnosis unit 15X and the multiple rotation counter 33Y is connected to the comparative diagnosis unit 15Y. Furthermore, in the encoder 3B, the light-receiving unit 12 is connected to the cumulative-number calculation units 14X and 14Y. The light-receiving unit 12 according to the present embodiment transmits the analog signal to the cumulative-number calculation units 14X and 14Y.

The pulse disk 30 includes a magnet 31 near a central portion of a disk member. The magnetic sensor 32 is arranged on the other principal surface of the pulse disk 30, and serves as the rotation detection unit that magnetically detects the rotational position of the rotational shaft 51. The magnetic sensor 32 detects a magnetic force of the magnet 31.

When the rotational shaft 51 rotates, the pulse disk 30 rotates and the magnet 31 thereby rotates. The magnetic sensor 32 detects the magnetic force changing by rotation of the magnet 31 and converts a detection result into a pulse signal. The magnetic sensor 32 transmits the pulse signal to the multiple rotation counters 33X and 33Y.

Each of the multiple rotation counters 33X and 33Y counts the rotations of the rotational shaft based on the pulse signal. The pulse signal mentioned here is the signal (rotation signal) indicating one rotation of the rotational shaft 51. Therefore, each of the multiple rotation counters 33X and 33Y counts the rotations of the rotational shaft 51 using the signal indicating one rotation of the rotational shaft 51.

The multiple rotation counter 33X transmits the counted number of rotations to the comparative diagnosis unit 15X of the arithmetic unit 10X as the multiple rotation data (Mx). The multiple rotation counter 33Y transmits the counted number of rotations to the comparative diagnosis unit 15Y of the arithmetic unit 10Y as the multiple rotation data (My). Because the encoder 3B conducts a fault diagnosis, identifies a faulty portion, continues to operate using normal portions, and performs other procedures by processes similar to those performed by the encoder 3A, explanations of the fault diagnosis and the like will be omitted.

In this way, according to the second embodiment, it is possible to perform a highly reliable fault detection and to conduct the fault diagnosis similarly to the first embodiment. Furthermore, because the accumulated multiple rotation data (Ax) and (Ay) are generated by an optical rotation detection and the multiple rotation data (Mx) and (My) are generated by a magnetic rotation detection, it is possible to detect the rotational position of the rotational shaft 51 by the use of the non-common detection systems. Therefore, it is possible to perform a more highly reliable fault detection.

Third Embodiment

A third embodiment of the present invention is explained with reference to FIG. 4. In the third embodiment, the pulse signal detected using the magnetic sensor is transmitted to one of the multiple rotation counters. The analog signal detected using the light-receiving unit 12 is transmitted to the other multiple rotation counter. With this configuration, one multiple rotation counter generates the multiple rotation data based on the pulse signal and the other multiple rotation counter generates the multiple rotation data based on the analog signal.

Figure 4:
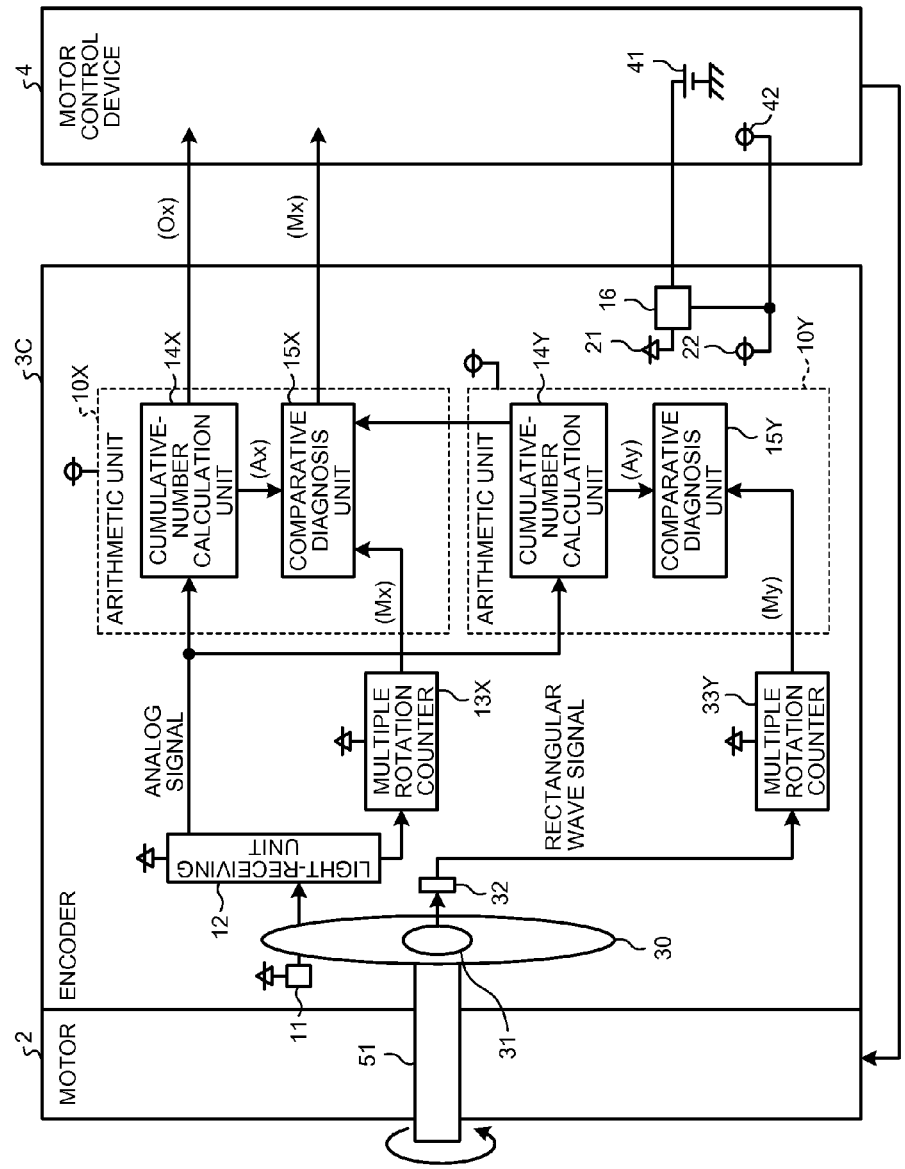
FIG. 4 depicts a configuration of a servo system including an encoder according to a third embodiment.

FIG. 4 depicts a configuration of a servo system including an encoder according to the third embodiment. Among the constituent elements shown in FIG. 4, those achieving like functions as the servo system 1A according to the first embodiment shown in FIG. 1 and the servo system 1B according to the second embodiment shown in FIG. 3 are denoted by like reference signs and redundant explanations will be omitted.

The servo system 1C includes a servomotor (the motor 2 and an encoder 3C) and the motor control device 4. The encoder 3C includes the multiple rotation counter 13X in place of the multiple rotation counter 33X, as compared with the encoder 3B.

The multiple rotation counter 13X is connected to the light-receiving unit 12 and the multiple rotation counter 33Y is connected to the magnetic sensor 33. Furthermore, in the encoder 3C, the multiple rotation counter 13X is connected to the comparative diagnosis unit 15X and the multiple rotation counter 33Y is connected to the comparative diagnosis unit 15Y.

The magnetic sensor 32 according to the present embodiment transmits the pulse signal to the multiple rotation counter 33Y. The multiple rotation counter 33Y counts the rotations of the rotational shaft based on the pulse signal. The multiple rotation counter 33Y transmits the counted number of rotations to the comparative diagnosis unit 15X of the arithmetic unit 10Y as the multiple rotation data (My).

The multiple rotation counter 13X transmits the counted number of rotations to the comparative diagnosis unit 15X of the arithmetic unit 10X as the multiple rotation data (Mx). Because the encoder 3C conducts a fault diagnosis, identifies a faulty portion, continues to operate using normal portions, and performs other procedures by processes similar to those performed by the encoder 3A, explanations of the fault diagnosis and the like will be omitted.

In the encoder 3C, the multiple rotation counters 13Y and 33X can be used in place of the multiple rotation counters 13X and 33Y. In this case, the multiple rotation counter 33X is connected to the light-receiving unit 12 and the comparative diagnosis unit 15X is connected to the multiple rotation counter 33X. Furthermore, the multiple rotation counter 13Y is connected to the magnetic sensor 32 and the comparative diagnosis unit 15Y is connected to the multiple rotation counter 13Y.

In this way, according to the third embodiment, it is possible to perform a highly reliable fault detection and to conduct the fault diagnosis similarly to the first embodiment. Furthermore, because the accumulated multiple rotation data (Ax) and (Ay) and the multiple rotation data (Mx) are generated by the optical rotation detection and the multiple rotation data (My) is generated by the magnetic rotation detection, it is possible to perform a highly reliable fault detection with the simple configuration.

INDUSTRIAL APPLICABILITY

As described above, the servomotor and the encoder according to the present invention are suitable for a detection of a fault in an encoder.

REFERENCE SIGNS LIST 1A to 1C servo system, 2 motor, 3A to 3C encoder, 4 motor control device, 10X, 10Y arithmetic unit, light-receiving unit, 13X, 13Y, 33X, 33Y multiple rotation counter, 14X, 14Y cumulative-number calculation unit, 15X, 15Y comparative diagnosis unit, 16 power-supply switching circuit, 21 battery power supply, 22 control power supply, 30, 50 pulse disk, 32 magnetic sensor, 41 battery, 42 power supply unit, 51 rotation shaft.

The invention claimed is:
1. A servomotor comprising:
a motor including a rotational shaft; and
an encoder that generates multiple rotation data obtained by counting rotations of the rotational shaft using rotation signals that indicate one rotation of the rotational shaft, one-rotation data calculated using an angle signal that indicates a rotational angle of the rotational shaft and indicating a rotational angle within one rotation, and accumulated multiple rotation data obtained by accumulating the rotational angles using the angle signal and by counting the rotations of the rotational shaft whenever the rotational shaft makes one rotation, and that transmits either the multiple rotation data or the accumulated multiple rotation data and the one-rotation data to a motor control device, wherein
the encoder includes
a rotation detection unit that detects a rotational position of the rotational shaft,
a first multiple rotation counter that generates first multiple rotation data using the rotation signals generated based on the rotational position,
a second multiple rotation counter that generates second multiple rotation data using the rotation signals generated based on the rotational position,
a first cumulative-number calculation unit that calculates first accumulated multiple rotation data using the angle signal generated based on the rotational position,
a second cumulative-number calculation unit that calculates second accumulated multiple rotation data using the angle signal generated based on the rotational position, and
a first comparative diagnosis unit that performs a comparison to determine whether at least four values including at least two values relating to number of rotations and generated using rotation signals and at least two values relating to number of rotations and calculated using the angle signal are a same value by performing a compari- son to determine whether the first multiple rotation data, the second multiple rotation data, the first accumulated multiple rotation data, and the second accumulated multiple rotation data are a same value, and that diagnoses whether the encoder has a fault based on a comparison result.

2. The servomotor according to claim 1, wherein the first comparative diagnosis unit estimates a faulty portion in the encoder based on which one of the first multiple rotation data, the second multiple rotation data, the first accumulated multiple rotation data, and the second accumulated multiple rotation data is a different value from the other data.

3. The servomotor according to claim 1, wherein
the rotation detection unit is arranged in the encoder, and serves as a first rotation detection unit that optically detects the rotational position of the rotational shaft, and
the rotation signals and the angle signal are generated based on the rotational position detected by the first rotation detection unit.

4. The servomotor according to claim 1, wherein
the rotation detection unit includes
a first rotation detection unit that optically detects the rotational position of the rotational shaft, and
a second rotation detection unit that magnetically detects the rotational position of the rotational shaft,
the angle signal is generated based on the rotational position detected by the first rotation detection unit, and
the rotation signals are generated based on the rotational position detected by the second rotation detection unit.

5. The servomotor according to claim 1, wherein
the rotation detection unit includes
a first rotation detection unit that optically detects the rotational position of the rotational shaft, and
a second rotation detection unit that magnetically detects the rotational position of the rotational shaft,
the angle signal is generated based on the rotational position detected by the first rotation detection unit, and
one of the rotation signals is generated based on the rotational position detected by the first rotation detection unit, and the other rotation signal is generated based on the rotational position detected by the second rotation detection unit.

6. The servomotor according to claim 1, wherein
the encoder further includes a second comparative diagnosis unit that diagnoses whether the encoder has a fault by performing a comparison to determine whether the first multiple rotation data, the second multiple rotation data, the first accumulated multiple rotation data, and the second accumulated multiple rotation data are a same value, and
the first or second comparative diagnosis unit diagnoses whether the first and second comparative diagnosis units have a fault by comparing a diagnosis result of a fault diagnosis conducted by the first comparative diagnosis unit with a diagnosis result of a fault diagnosis conducted by the second comparative diagnosis unit.

7. The servomotor according to claim 1, wherein
the encoder further includes a second comparative diagnosis unit that compares the second multiple rotation data with the second accumulated multiple rotation data to determine whether the second multiple rotation data and the second accumulated multiple rotation data are a same value,
the second comparative diagnosis unit transmits a comparison result to the first comparative diagnosis unit, and
the first comparative diagnosis unit diagnoses whether the encoder has a fault using the comparison result.

8. The servomotor according to claim 1, wherein
the encoder further includes
a control power supply that supplies power while the motor control device is powered on, and
a battery power supply that supplies power while the motor control device is powered on or powered off,
the first cumulative-number calculation unit, the second cumulative-number calculation unit, and the first comparative diagnosis unit are connected to the control power supply, and
the rotation detection unit and the first and second multiple rotation counters are connected to the battery power supply.

9. The servomotor according to claim 1, wherein the servomotor stops to operate when the first comparative diagnosis unit determines that the encoder has a fault.

10. The servomotor according to claim 1, wherein the servomotor continues to operate by transmitting normal data among the first multiple rotation data, the second multiple rotation data, the first accumulated multiple rotation data, and the second accumulated multiple rotation data to the motor control device when the first comparative diagnosis unit determines that the encoder has a fault.

11. A servomotor comprising:
a motor including a rotational shaft; and
an encoder that generates multiple rotation data obtained by counting rotations of the rotational shaft using a rotation signal that indicates one rotation of the rotational shaft, one-rotation data calculated using an angle signal that indicates a rotational angle of the rotational shaft and indicating a rotational angle within one rotation, and accumulated multiple rotation data obtained by accumulating the rotational angles using the angle signal and by counting the rotations of the rotational shaft whenever the rotational shaft makes one rotation, and that transmits either the multiple rotation data or the accumulated multiple rotation data and the one-rotation data to a motor control device, wherein
the encoder includes
a rotation detection unit that detects a rotational position of the rotational shaft,
a multiple rotation counter that generates the multiple rotation data using the rotation signal generated based on the rotational position,
a first cumulative-number calculation unit that calculates first accumulated multiple rotation data using the angle signal generated based on the rotational position,
a second cumulative-number calculation unit that calculates second accumulated multiple rotation data using the angle signal generated based on the rotational position, and
a comparative diagnosis unit that performs a comparison to determine whether at least three values including at least one value relating to number of rotations and generated using the rotation signal and at least two values relating to number of rotations and calculated using the angle signal are a same value by performing a comparison to determine whether the multiple rotation data, the first accumulated multiple rotation data, and the second accumulated multiple rotation data are a same value, and that diagnoses whether the encoder has a fault based on a comparison result.

12. An encoder that generates multiple rotation data obtained by counting rotations of a rotational shaft of a motor that includes the rotational shaft using a rotation signal that indicates one rotation of the rotational shaft, one-rotation data calculated using an angle signal that indicates a rotational angle of the rotational shaft and indicating a rotational angle within one rotation, and accumulated multiple rotation data obtained by accumulating the rotational angles using the angle signal and counting the rotations of the rotational shaft whenever the rotational shaft makes one rotation, and transmits either the multiple rotation data or the accumulated multiple rotation data and the one-rotation data to a motor control device, the encoder comprising:

- a rotation detection unit that detects a rotational position of the rotational shaft;
- a first multiple rotation counter that generates first multiple rotation data using the rotation signal generated based on the rotational position;
- a second multiple rotation counter that generates second multiple rotation data using the rotation signal generated based on the rotational position;
- a first cumulative-number calculation unit that calculates first accumulated multiple rotation data using the angle signal generated based on the rotational position;
- a second cumulative-number calculation unit that calculates second accumulated multiple rotation data using the angle signal generated based on the rotational position; and
- a first comparative diagnosis unit that performs a comparison to determine whether at least four values including at least two values relating to number of rotations and generated using the rotation signal and at least two values relating to number of rotations and calculated using the angle signal are a same value by performing a comparison to determine whether the first multiple rotation data, the second multiple rotation data, the first accumulated multiple rotation data, and the second accumulated multiple rotation data are a same value, and that diagnoses whether the encoder has a fault based on a comparison result.

* * * * *